(No Model.)
W. H. H. KNIGHT.
MECHANICAL MOVEMENT.
No. 588,447.
2 Sheets—Sheet 1.
Patented Aug. 17, 1897.
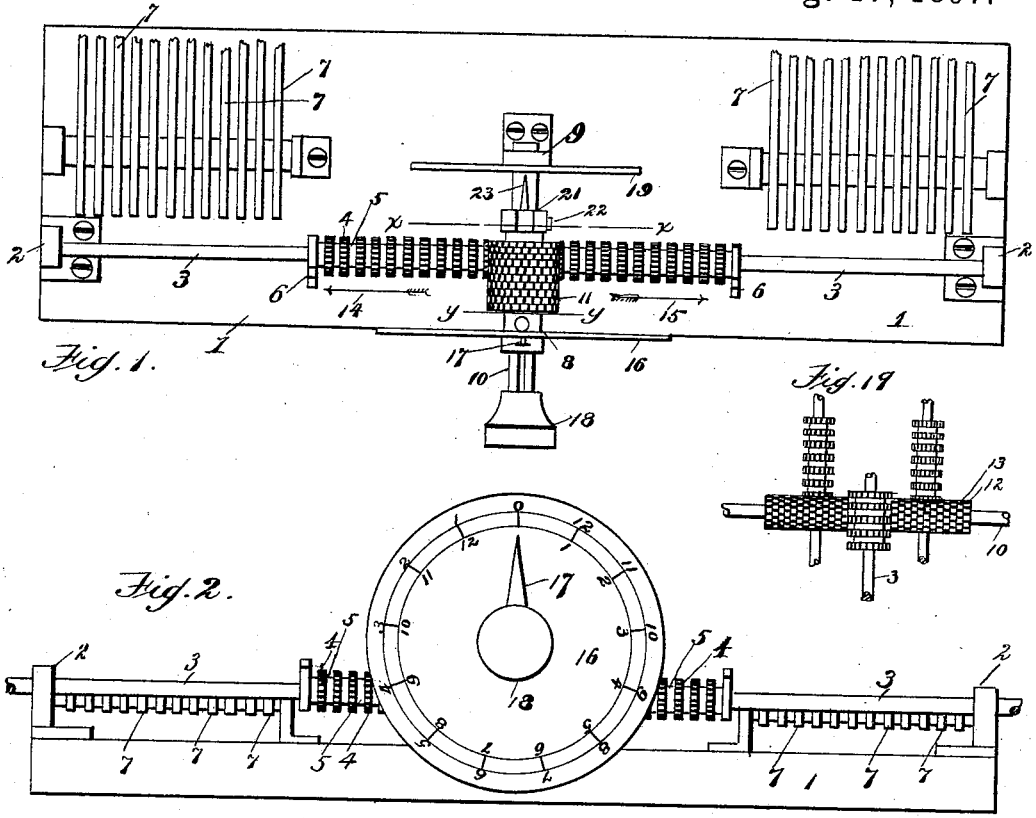
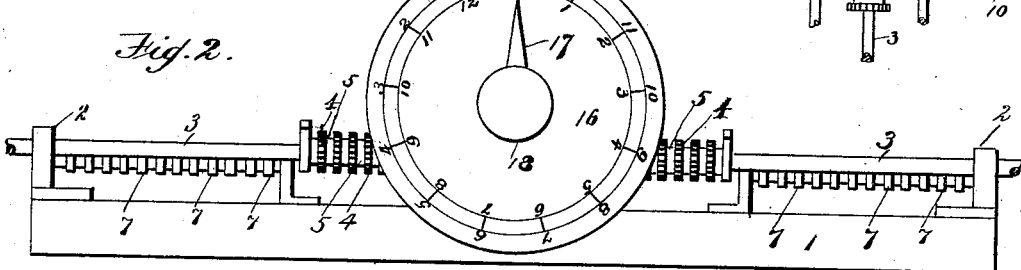
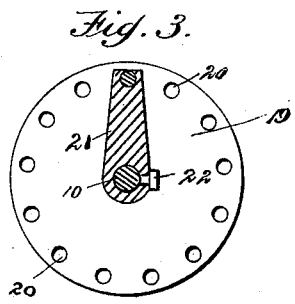
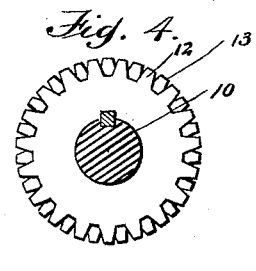
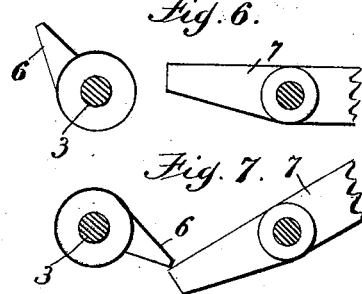
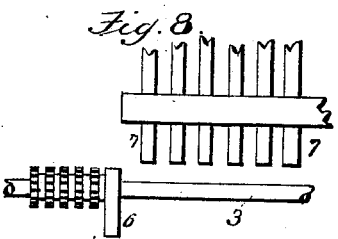
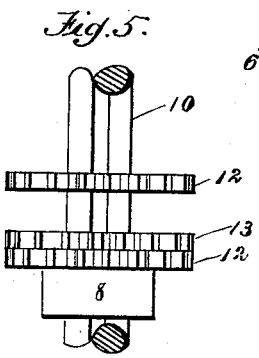
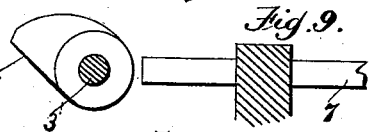
Witnesses:
J. H. Cook
H. S. Knight.
William H. H. Knight
Inventor.
THE NORRIS PETERS CO., PHOTO-LITHO., WASHINGTON, D. C.

(No Model.) 2 Sheets—Sheet 2.

W. H. H. KNIGHT.
MECHANICAL MOVEMENT.

No. 588,447. Patented Aug. 17, 1897.

Witnesses:
J. W. Cook
H. S. Knight.

William H. H. Knight
Inventor:

THE NORRIS PETERS CO., PHOTO-LITHO., WASHINGTON, D. C.

UNITED STATES PATENT OFFICE.

WILLIAM H. H. KNIGHT, OF WASHINGTON, DISTRICT OF COLUMBIA.

MECHANICAL MOVEMENT.

SPECIFICATION forming part of Letters Patent No. 588,447, dated August 17, 1897.

Application filed April 3, 1896. Serial No. 586,123. (No model.)

*To all whom it may concern:*

Be it known that I, WILLIAM H. H. KNIGHT, a citizen of the United States, residing at Washington, in the District of Columbia, have invented certain new and useful Improvements in Mechanical Movements; and I do hereby declare the following to be a full, clear, and exact description of the invention, such as will enable others skilled in the art to which it appertains to make and use the same.

My invention relates in general to the class of mechanical movements, and in particular it contemplates the provision in a device of the class named of new and novel means and mechanism whereby either of two or more connected shafts or their equivalents may be used at will to impart a reciprocating movement, a tilting movement, or a rotating movement to the remaining shaft or shafts for the purpose of moving any desired one of a series of sliding or pivoted rods or pitmen.

The invention further contemplates the provision, with either of said shafts, of a single button and connected means whereby to operate said shafts and to absolutely and accurately determine the extent to which the said shafts are moved.

The invention further contemplates the provision of means, in combination with the said shafts, whereby they may be held in connection with any desired one of said sliding or pivoted rods or pitmen or at any desired point of movement, either reciprocating or rotary.

To the accomplishment of the above ends the invention consists in the construction, arrangement, and combination of the various parts comprised therein, substantially as hereinafter described, and illustrated in the accompanying drawings, wherein—

Figure 11:
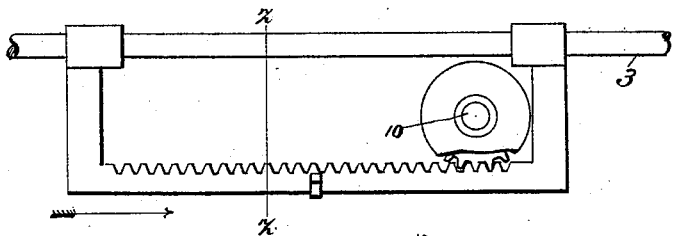
Figure 12:
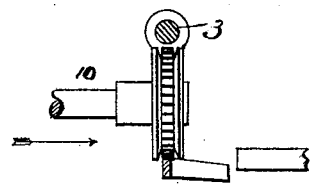
Figure 13:
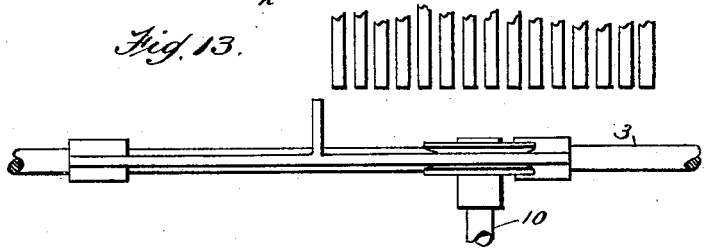
Figure 14:
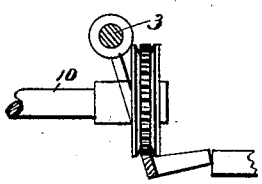
Figure 15:
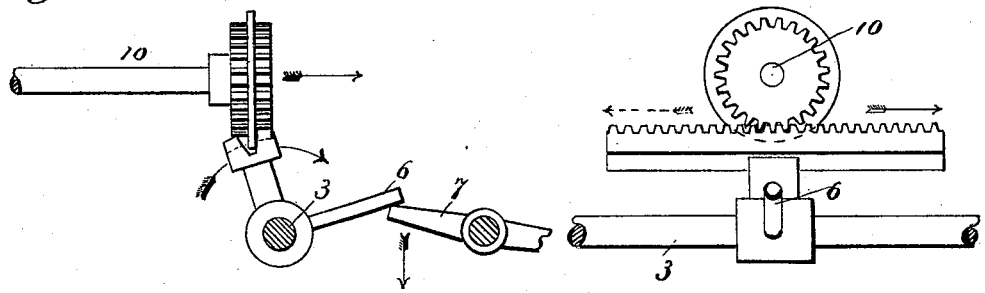
Figure 16:
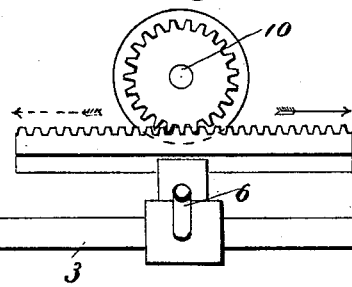
Figure 17:
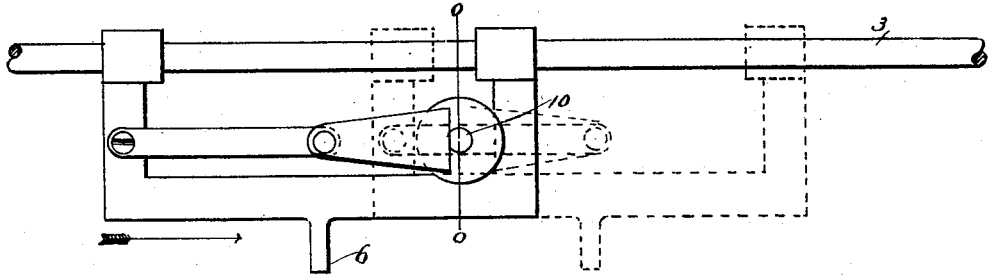
Figure 18:
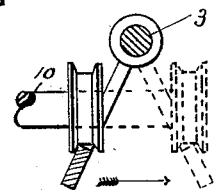

Figure 1 represents in a top plan view a device embodying my invention. Fig. 2 is a front elevation of the device illustrated in Fig. 1. Fig. 3 is an enlarged detail sectional elevation taken on the line $x$ $x$ of Fig. 1 to clearly show the means whereby the operating-shaft is locked against rotation. Fig. 4 is an enlarged detail sectional elevation taken on the line $y$ $y$ of Fig. 1 to show construction of the master-gear shaft of the device shown herein. Fig. 5 is a top plan view of the parts shown in Fig. 4. Figs. 6 and 7 are enlarged detached detail views of parts of the mechanism shown in Fig. 1. Fig. 8 shows a modified form of parts of the mechanism shown in Fig. 1. Figs. 9 and 10 are enlarged detail elevations of the mechanism shown in Fig. 8, illustrating said mechanism at different periods of its operation. Figs. 11, 15, and 17 illustrate other forms wherein my invention is embodied. Figs. 12 and 14 are transverse sectional views taken on the line $z$ $z$ of Fig. 11 and show said form in different positions. Fig. 13 is a top plan view of the mechanism shown in Fig. 11. Fig. 16 is a front elevation of the device shown in Fig. 15. Fig. 18 is a transverse sectional view taken on the line $o$ $o$ of Fig. 17. Fig. 19 shows a number of shafts connected to operate in accordance with my invention.

Similar numerals of reference in the several drawings denote similar parts.

The principle underlying the device illustrated in the accompanying drawings—namely, the possession by each of two or more connected shafts of the capability of motion both in the plane of the axis of said shafts or at right angles thereto—that is to say, movement either endwise or in rotary direction—may be advantageously employed in very many different devices for many purposes. This fact is particularly true of devices wherein it is either desirable or necessary to employ a single button or key to operate any desired one of a number of separate and distinct rods, levers, arms, keys, &c., either for the purpose of moving any particular one of a number of separate visual signals, as in cash-registers or devices of like character, or for the purpose of connecting a single conductor of electricity with any particular one of a number of separate conductors of electricity, as in telegraphy, or in connection with telephones and like instruments, or for the purpose of operating any particular one of a series of slides or covers to close separate compartments made to hold different articles—as, for instance, cabinets to hold thread, candy, &c.—or for a large number of different devices not named herein.

While, as above stated, the principle which underlies the invention herein described is applicable for use in devices which appertain to many of the arts, I yet do not desire to limit or confine its use to any particular one thereof, and I therefore have, as set forth herein, embodied such principle in a device the main elements of which are adapted to be employed in any and all of the devices hereinbefore referred to, as also in devices not specifically named herein.

In the present embodiment of my invention I provide a suitable support or base 1 with standards 2, which receive the opposite ends of a shaft 3, that is journaled and moves in said standards, as shown.

I provide the shaft 3 with a series of gear-pinions 4, arranging the teeth thereof in alinement with each other, as shown, and preferably spacing said gear-pinions by collars or disks 5 at equal distances from each other, which distance corresponds (for a purpose hereinafter explained) with the thickness of one of said pinions 4.

If desired, the pinions 4 and collars or disks 5 may be formed in a single piece.

I provide the gear-section thus formed with a projecting finger or fingers 6 to contact with and operate any desired one of a series of pivoted arms or rods 7, which extend to and are connected with the various devices that are to be moved.

If desired, the gear-section carrying the finger or fingers 6 may be sleeved on the shaft 3 to move back and forth thereon, as shown.

I provide the base 1 with additional standards 8 and 9 to receive a shaft 10, which moves at right angles to the shaft 3 and is provided with a gear-section 11, that engages and in the present case operates the gear-section on the shaft 3.

By reference to the drawings, Figs. 1, 4, and 5, it will be observed that the several separate gear-pinions 12 and 13 comprised in the gear-section 11 abut against each other, also that the teeth of adjoining pinions are staggered—that is to say, the teeth of the one pinion being arranged opposite to the spaces of the pinions next adjoining—by which arrangement only is it possible to insure the operation of the gear-sections described in the manner set forth hereinbefore—viz., to use either at will as a rack-bar to move a pinion or as a pinion to move a rack-bar.

It will be understood that the combined thickness of one each of the pinions 4 and collars 5 on the shaft 3 is equal to the pitch of the gear-pinions upon the shaft 10, also that the combined thickness of two of said latter-named pinions is equal to the pitch of the pinions on shaft 3.

It will be understood that the gear-section 11 is rigid with the shaft 10 and that consequently the rotation of said shaft 10 will, through the gear 11, move the gear and shaft 3 forward and backward in the direction of the arrows 14 and 15 and the fingers 6 thereon into position to engage with any desired one of the arms or rods 7.

It will also be understood that a back-and-forth or reciprocating movement of the shaft 10 will rotate the shaft 3 through the connected gear-pinions and will bring the fingers 6 into contact with the arms or rods 7 to move the devices connected therewith.

To determine the distance to be moved by the shaft 3 in order that the fingers 6, carried thereby, may contact with any particular one of the arms or rods 7, I provide a dial 16, which is rigidly secured to the standard 8, is pierced at its center for the passage of the shaft 10, and is provided upon its front face, concentric with said shaft, with indices, which are numbered consecutively to accord with the numbers upon the arms or rods 7.

I provide the shaft 10 with an indicating finger or hand 17, that is adapted to be moved by the shaft 10 to point to any of the indices on the dial. (See Figs. 1 and 2.) I also provide the shaft 10 with a button 18, by which said shaft may be turned.

To hold or maintain the fingers 6 in proper connection with but one of the arms or rods 7 when the button 18 has been turned to indicate said arm, I provide the following-described mechanism, viz: a dial or disk 19, which I secure to the rear standard 9 of the shaft 10 and provide with a series of apertures 20, that are concentric with said shaft 10 and correspond in number and location with the indices on the dial 16.

I provide the shaft 10, immediately in front of said disk 19, with a projecting arm 21, which is held in position on said shaft by a set-screw 22 and is provided at or near its outer free end with a projecting pin or stud 23, which extends nearly to the disk 19 and enters one of the apertures 20 when the shaft 10 is moved longitudinally to bring the finger 6 into contact with the arms 7.

The operation of the device will be readily understood from the foregoing description, taken in connection with the drawings.

The modified forms of my invention, which are illustrated in Figs. 11 to 18, inclusive, of the drawings, set forth the principle upon which such invention is based—viz., shafts arranged at angles (preferably right angles) to each other and connections between said shafts, whereby either thereof is adapted to be moved by the other in either a rectilineal or a rotary direction.

Fig. 19 illustrates the manner in which a number of shafts may be connected to be operated by a single button or key.

Having thus described my invention, I claim and desire to secure by Letters Patent—

1. A mechanical movement comprising shafts capable of reciprocating and rotating movement, and mechanism therebetween, whereby each may impart either a reciprocating or a rotating movement to the other, substantially as described.

2. A mechanical movement comprising shafts capable of reciprocating and rotating movement, and gear connections between said shafts whereby each may impart either a reciprocating or a rotating movement to the other, substantially as described.

3. In a mechanical movement, a shaft capable of reciprocating and rotating movement, a device connected to said shaft to move a device separate therefrom, and said latter device, in combination with an operating-shaft also capable of a reciprocating and a rotating movement, and mechanism between said latter and former named shafts whereby each may impart either a reciprocating or a rotating movement to the other, substantially as described.

4. In a mechanical movement a shaft capable of reciprocating and rotating motion, a gear-section on said shaft, a finger connected to said shaft to move separate rods or arms, and said rods or arms, in combination with an operating-shaft also capable of reciprocating and rotating movement, and a gear-section upon said operating-shaft in engagement with the gear-section of said former-named shaft, to impart a reciprocating or a rotary motion thereto, substantially as described.

5. In a mechanical movement shafts capable of reciprocating or rotating movement, connections between said shafts whereby each may impart a reciprocating or a rotating movement to the other, and mechanism to positively determine the extent of movement of said shafts, as and for the purpose set forth.

6. In a mechanical movement a shaft 3, capable of reciprocating and rotating movement, and a gear-section thereon, in combination with a shaft 10, also capable of reciprocating and rotating movement and having a gear-section engaging the gear-section of the shaft 3, to impart uniform reciprocating or rotating movement from one to the other of said shafts, and means substantially as described to positively limit and determine such movement, as and for the purpose set forth.

7. In a mechanical movement an operating-shaft capable of reciprocating or rotating movement and provided with a gear-section, an operating-button, and an indicating-arm, in combination with a shaft to be operated in rectilineal or rotary direction and provided with a gear-section engaging the gear-section of the operating-shaft, and a disk having indices to determine the movement of the shafts, substantially as described.

8. In a mechanical movement shafts capable of reciprocating and rotating movement, connections between said shafts whereby each may receive a reciprocating or a rotating movement from the other, connections to positively determine the movement of the operating-shaft, and means substantially as described to maintain said operating-shaft at any desired adjustment while the device is being operated, as and for the purpose set forth.

9. The combination with shafts capable of rectilineal and rotary movement, said shafts arranged at angles to each other and provided with gear-sections connected to impart such rectilineal or rotary movement from one to the other thereof, of a non-movable disk provided with indices, and a non-movable disk provided with apertures said disks operating respectively in connection with an indicating-arm, and an arm having a detaining-stud, each of which arms is connected to one of said shafts, substantially as described.

10. In a mechanical movement the combination of a gear-section comprising contacting pinions having teeth staggered as shown to be engaged and operated in a rectilineal or a rotary direction by a gear-section with said latter-named gear-section, substantially as described.

11. In a mechanical movement a shaft having a gear-section comprising contacting pinions having teeth staggered as shown, in combination with a shaft having a gear-section comprising pinions having teeth in alinement with each other, to engage and move said staggered gear-section in rectilineal or rotary direction, and with means to move and to determine the movement of said shafts, substantially as described.

In testimony whereof I affix my signature in presence of two witnesses.

WILLIAM H. H. KNIGHT.

Witnesses:
HENRY E. COOPER,
H. S. KNIGHT.